Figures 1, 2:
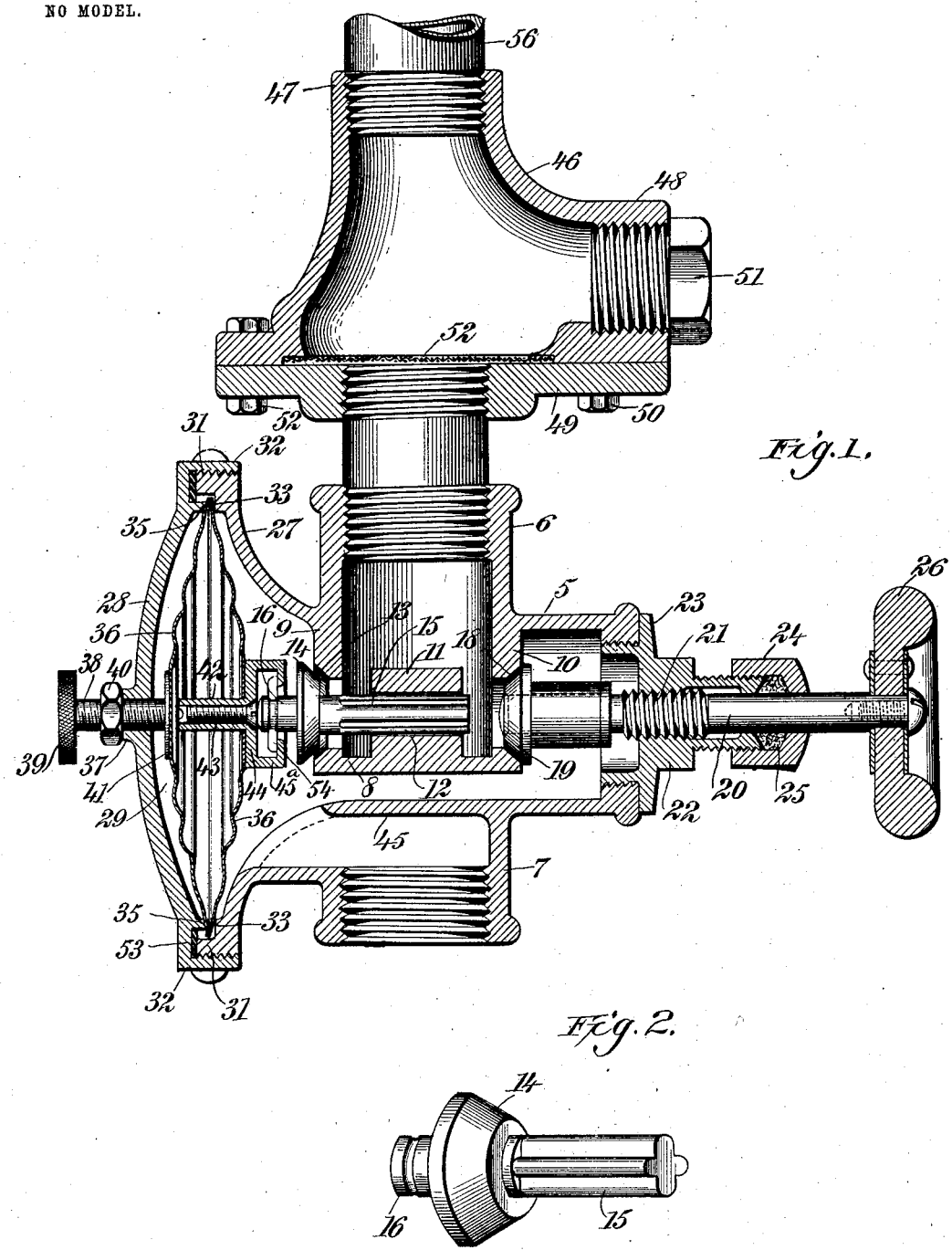

No. 753,557. PATENTED MAR. 1, 1904.
C. A. DUNHAM.
STEAM TRAP.
APPLICATION FILED APR. 30, 1903.
NO MODEL.

WITNESSES:
Paul Hunter
H. J. Bernhofs

INVENTOR
Clayton A. Dunham
BY
ATTORNEYS.

No. 753,557. Patented March 1, 1904.

UNITED STATES PATENT OFFICE.

CLAYTON AUBRA DUNHAM, OF MARSHALLTOWN, IOWA.

STEAM-TRAP.

SPECIFICATION forming part of Letters Patent No. 753,557, dated March 1, 1904.

Application filed April 30, 1903. Serial No. 154,933. (No model.)

*To all whom it may concern:*

Be it known that I, CLAYTON AUBRA DUNHAM, a citizen of the United States, and a resident of Marshalltown, in the county of Marshall and State of Iowa, have invented a new and Improved Steam-Trap, of which the following is a full, clear, and exact description.

The present invention relates to improvements in drain-valves and steam-traps of the general class disclosed by my prior application for Letters Patent filed July 5, 1902, Serial No. 114,485.

Among other things the present invention has for its object the provision of an improved trap adapted for low-pressure or vacuum work or in places where there is oil mixed with the condensation, such as drips from exhaust-steam heaters or oil-separators, to prevent the collapse of the walls forming the chambered diaphragm; to provide the trap with a by-pass adapted to be closed and opened at will; to provide means for holding the chambered diaphragm in place without interfering with its operation and to secure a steam-tight joint to the inclosing casing; to provide the trap with a strainer device which is constructed so as to permit access to be obtained easily to the interior thereof for cleaning out sediment and without disturbing its position in the trap, and to provide for the contractive movement of the diaphragm which is utilized in opening the valve.

Further objects and advantages of the invention will appear in the course of the subjoined description, and the novelty will be defined in the annexed claims.

Reference is to be had to the accompanying drawings, forming a part of this specification, in which similar characters of reference indicate corresponding parts in both the figures.

Figure 1 is a vertical sectional elevation through a drain-valve and steam-trap constructed in accordance with the present invention; and Fig. 2 is an enlarged detail perspective view of a portion of the valve-stem, showing it removed from the trap and valve.

5 designates the casing of the combined trap and valve, which is provided on its upper side with a nipple 6, constituting the inlet to the trap, while a similar nipple 7 is provided on the lower side of the casing to form an outlet from said trap, the inlet and outlet nipples being disposed in the same vertical plane, as shown by Fig. 1 of the drawings. Within the trap is formed or provided a bridge 8, which is joined to the top wall of the trap by the parallel walls 9 10, the latter being situated on opposite sides of the vertical axis through the inlet 6 and the outlet 7. The bridge has an upstanding lug 11, which is disposed between the parallel walls 9 10, and in this lug is formed a passage 12, adapted to slidably receive the valve-stem, to be presently described.

The wall 9 is provided with a conical opening 13, the boundary-wall of which constitutes the seat for a slidable valve 14, said valve being fashioned to fit snugly to the seat 13. This valve 14 has a projecting spindle 15, which is of corrugated or grooved construction, as shown by Figs. 1 and 2. The grooved spindle passes through the opening in the wall 9 and is fitted loosely in the opening 12 of the lug 11, said spindle confining and guiding the valve in slidable relation to the seat 13. The other side of the valve 14 is provided with an axial short stem 16, which is constructed in a suitable way to fit into a socket provided in a suitable tool or implement adapted to rotate the valve for the purpose of grinding it to the seat 13, thereby making provision for the expeditious repair of the valve without removing the latter from the casing and without detaching said casing from the pipes, which are adapted to be connected to the inlet 6 and the outlet 7, respectively.

In the wall 10 is formed a by-pass port 18, into which is adapted to fit the inner conical end of a valve 19, said valve being provided on the inner extremity of a stem 20, which is threaded for a part of its length, as at 21, and is adapted to be screwed into a bushing 22, said bushing being made in a single piece with a cap 23, that is screwed into one end of the casing 5. The bushing 22 extends a suitable distance beyond the cap 23 to receive a gland 24, within which is a packing of suitable material 25, thereby forming a stuffing-box for the valve-stem 20. Said valve-stem protrudes through the gland 24 and is provided with a suitable hand-wheel 26 or other device for its convenient manipulation. The other end of the casing 5 is enlarged or expanded to form a plate 27, that coöperates with another plate 28 in a way to produce a diaphragm-chamber 29. The plate 27 is made in one piece with the casing 5, and it is furnished with a threaded periphery and with a flange 31. The removable plate 28 has a peripheral flange 32, which is internally threaded and is adapted to be screwed on the threaded portion and into engagement with the flange 31, forming a part of the plate 27. This plate 27 is formed with an internal annular shoulder 33, whereas the removable plate 28 is provided with an internal flange 35, the latter lying within the threaded peripheral flange 32.

The diaphragm is of chambered construction, substantially as disclosed by my prior application, to which reference has been made, and, as shown by Fig. 1, this diaphragm consists of dished corrugated plates 36, assembled in opposing relation to form an intermediate chamber and united at their peripheral edges, preferably by first sweating their edges together, lapping the plates, and soldering the same, preferably by using silver solder. This diaphragm is of such diameter as to fit snugly within the internal flange 31 of the plate 27, one side of the diaphragm resting against the shoulder 33. The plate 28 is adapted to be screwed onto the edge of the plate 27 in a way to bring its internal shoulder 35 into engagement with the other side of the chambered diaphragm and to coöperate with the shoulder 33 in clamping said diaphragm between the plates 27 28. This diaphragm is held peripherally within the chamber 29 by the coöperation of the two plates and the lines of engagement of the plates with said diaphragm are furnished by the shoulder 33 and the flange 35, whereby the diaphragm is free to expand or contract inside of the chamber 29 without interfering with the clamping engagement of the two plates 27 28 therewith.

The plate 28 is provided with a nipple 37, into which is screwed an adjusting-screw 38, having a milled head 39 and a check-nut 40. Between the inner end of this adjusting-screw and one plate of the chambered diaphragm is interposed a washer or wear-plate 41, said screw having engagement with the diaphragm to control the amplitude of vibration thereof. The other plate of the diaphragm is provided with a filling-nozzle 42, which is extended through the chamber formed by the plates 36 of the diaphragm, the inner end of said nozzle engaging with or terminating close to one of the diaphragm-plates on the inside thereof. The nozzle 42 is provided with a screw-plug 43, having a conical head, the latter fitting snugly to a seat provided in the nozzle for the purpose of tightly closing or sealing the diaphragm. The nozzle also has a shoulder 44, that rests against and is secured to the inner diaphragm-plate 36, and thus the nozzle is attached to one plate 36 and terminates at its outer end close to the other plate 36, whereby said nozzle prevents collapsing of the plates forming the diaphragm. The shoulder 44 at the inner end of the nozzle is fashioned to form a cup $45^a$, adapted to receive a pin 54 for the purpose of producing a detachable coupling between the diaphragm and the valve. The cup of the diaphragm-nozzle may be provided with one or more holes or grooves at its inner end to facilitate filling of the diaphragm.

The casing 5 is formed with an internal deflector 45, which overhangs the passage of the outlet-nipple 7 and has its free end terminating adjacent to one plate of the diaphragm. This deflector lies in the path of the liquid admitted to the chamber of the valve-casing through the inlet 6 and the valve-opening 13, whereby the deflector is adapted to direct the inflowing water against the chambered diaphragm, which is adapted to be charged with a volatile sensitive medium, such as ammonia.

In the practical service of the trap and valve I equip the device with a filter adapted to prevent any sediment from passing with the drained water into the trap and clogging the valve thereof. This filter has a casing 46, which is provided with legs 47 48, arranged at right angles to each other, one side of said casing being open and adapted for the reception of a plate 49, which is fastened detachably to the casing 46 by a series of bolts 50. The filter may have its plate 49 coupled to the inlet 6, as shown by Fig. 1, in which case the leg 48 is closed by means of a head or plug 51, which is screwed therein. A strainer 52, of wire fabric or metallic copper, is placed across the opening of the filter-casing 46, and this strainer is clamped between the casing and the plate 49 by the bolts 50. The inlet-pipe 56 is coupled to the leg 47 of the strainer-casing. It is evident that the plug 51 may be unscrewed from the leg 48 to allow easy access to be obtained to the strainer 52 for the purpose of cleaning the latter and the casing 46 from any sediment which may accumulate against the strainer or within the casing.

The employment of the internal flange 35 on the removable plate 28 forms a space 53, adapted to receive a packing of any suitable material, and when this packing is in position and the plate 28 is screwed on the plate 27 the shoulder 33 of said plate 27 coöperates with the flange 35 on the plate 28 in compressing said packing for the purpose of making a tight joint between the companion plates 27 28.

The cup $45^a$ of the diaphragm-nozzle receives the stem 16 of the valve, and said valve and diaphragm-nozzle are adapted to be connected operatively by the pin 54, which may be withdrawn through suitable notches in the cup $45^a$ of the nozzle.

Having thus described my invention, I claim as new and desire to secure by Letters Patent—

1. A steam-trap having a casing provided with an inlet and an outlet arranged directly in line with each other to facilitate connecting it to a horizontal or vertical pipe, a bridge joined to the upper part of the casing by spaced walls one of which is provided with a valve-opening, a guide-lug on the bridge, and a valve adapted to said opening and provided with a grooved stem which fits slidably in said guide-lug.

2. A trap of the class described, comprising a casing provided with an internal bridge arranged to form a by-pass, said bridge having a by-pass port in one side and a valve-port in the other side, a valve controllable at will and adapted to the by-pass port, and a diaphragm-controlled valve operatively related to the other port.

3. A trap of the class described, comprising a casing provided with an inlet and an outlet arranged in line with each other, a bridge within said casing to form a by-pass and having a valve-port and a by-pass port, a valve controllable at will and adapted to the by-pass port, and an automatically-controlled valve for closing the valve-port.

4. A trap of the class described, comprising a casing having an inlet and an outlet arranged in line with each other, a bridge disposed in said casing to form a by-pass in communication with the outlet, said bridge having a by-pass port in one side and a valve-port in another side, a valve controllable at will for closing the by-pass port, and a thermostatically-controlled valve adapted to the valve-port, said valve being disposed for movement across a line intersecting the inlet and outlet of the casing.

5. A trap of the class described, comprising a casing having an inlet and an outlet in line with each other, a hollow bridge within said casing and provided with a port, a guide on the bridge in line with the port therein, and a valve-stem slidable in the guide and having a valve adapted to said port.

6. A trap of the class described, having a valve-chamber and a laterally-extending expanded plate, said plate being provided with a threaded rim and with an internal bearing-shoulder, another plate screwed to said rim and having a flange disposed in coöperative relation to the shoulder of the first-named plate, a chambered diaphragm arranged for its edge portion to be laterally clamped between the shoulder and the flange of the plates, and a valve controllable by said diaphragm.

7. In a trap of the class described, a chambered diaphragm having laterally-yieldable members, a filling-nozzle attached to one of said members and projecting across the chamber to a point adjacent to the other member, and a closure for said nozzle, the latter serving to limit the relative play of the members to one another and as a means for replenishing the chamber.

8. A trap of the class described, having a casing provided with a valve-port, a diaphragm, a cup-shaped coupling member movable with said diaphragm, a valve-stem having projecting studs fitted in said coupling member and interlocked detachably therewith, and a valve movable with the stem.

9. A trap of the class described, comprising a casing having an inlet and an outlet, a diaphragm-controlled valve in said casing, and a filter-casing coupled to said inlet and provided with two legs disposed at an angle to one another, one of said legs having a removable closure and the other leg disposed in alinement with the inlet to the trap-casing, said filter-casing having a filtering medium.

10. A steam-trap having a casing provided with an inlet at its upper side, a filter-casing having two legs disposed at an angle to each other, one of said legs being coupled to the inlet of the casing and the other leg being closed by a removable head or plug, a valve within said casing, and a suitable filtering material confined within the filter-casing.

In testimony whereof I have signed my name to this specification in the presence of two subscribing witnesses.

CLAYTON AUBRA DUNHAM.

Witnesses:
 JAS. W. REED,
 EDGAR A. FRANCES.